United States Patent Office 3,051,716
Patented Aug. 28, 1962

3,051,716
THIAZOLYLTHIOCYCLOHEXANONES
John J. D'Amico, Charleston, W. Va., assignor to Monsanto Chemical Company, St. Louis, Mo., a corporation of Delaware
No Drawing. Filed Oct. 18, 1960, Ser. No. 63,254
11 Claims. (Cl. 260—302)

The present invention relates to thiazolylthiocyclohexamones and to methods for their preparation. These compounds, heretofore unknown, have a number of useful applications. They are valuable intermediates and accelerate vulcanization of rubber.

The products of the invention have the general formula

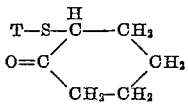

where T represents a thiazolyl group. As typical examples of thiazolyl radicals there may be mentioned 4-ethylthiazolyl,
4-methylthiazolyl,
4,5-dimethylthiazolyl,
4,5-diethylthiazolyl,
4-methyl-5-acetylthiazolyl,
4-methyl-5-carbomethoxythiazolyl,
4-methyl-5-carboethoxythiazolyl,
4-carboethoxythiazolyl,
4-methyl-5-carbamylthiazolyl,
4-methyl-5-phenylcarbamylthiazolyl,
benzothiazolyl,
4-ethylbenzothiazolyl,
7-methylbenzothiazolyl,
4-methylbenzothiazolyl,
5-methylbenzothiazolyl,
6-methylbenzothiazolyl,
4-chlorobenzothiazolyl,
4-methyl-6-chlorobenzothiazolyl,
6-chlorobenzothiazolyl,
6-phenylbenzothiazolyl,
4-phenylbenzothiazolyl,
4,5-dimethylbenzothiazolyl,
4,6-dimethylbenzothiazolyl,
4-methoxybenzothiazolyl,
5-methoxybenzothiazolyl,
6-methoxybenzothiazolyl,
4-methoxy-6-chlorobenzothiazolyl,
4-ethoxybenzothiazolyl,
5-ethoxybenzothiazolyl,
4,6-dimethyl-7-chlorobenzothiazolyl and
4,6-dimethyl-5,7-dichlorobenzothiazolyl.

It was discovered that compounds conforming to the general structure indicated above result from condensing thiazolesulfenamides with cyclohexanone. In the course of investigation of cyclohexylidene-2-thiazolesulfenamides it was observed that if the reaction mixture was heated in the presence of a base, compounds of unknown structure resulted. These were subsequently identified as thiazolylthiocyclohexanones. This novel rearrangement can be explained by the following mechanism:

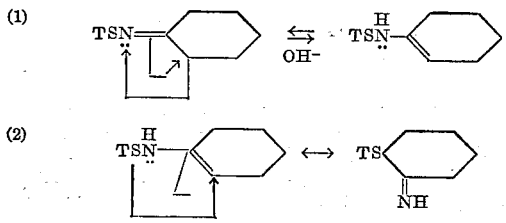

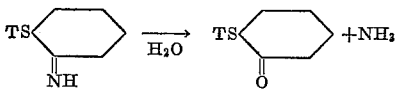

In this connection, the odor of ammonia was detected. The compounds are also obtainable by condensation of 2-chloro- or 2-bromocyclohexanone with an alkali salt of mercaptothiazole.

The following examples illustrate the preparation of the new compounds in detail but are not to be taken as limitative of the invention.

EXAMPLE 1

A charge consisting of 100 parts (0.548 mole) of 2-benzothiazolesulfenamide, 58.8 parts (0.6 mole) of cyclohexanone and 400 ml. of ethyl alcohol containing 30 ml. of 2 N sodium hydroxide was heated with stirring at 75–80° C. for 1 hour. After cooling to 5° C., 400 ml. of cold water was added and stirring continued for 30 minutes. The oily-water reaction mixture was poured into an evaporating dish and allowed to stand for one week. The resulting semi-solid was filtered, washed with 200 ml. of heptane and dried on a porous plate. After recrystallization from ethyl alcohol the 2-(2-benzothiazolylthio)cyclohexanone melted at 92–93° C. It was a tan solid obtained in 79.1% yield. Analysis gave 5.4% nitrogen and 24.3% sulfur compared to 5.3% nitrogen and 24.4% sulfur calculated for $C_{13}H_{13}NOS_2$.

EXAMPLE 2

The above described material was also prepared by the following method: To a stirred solution of 86 parts (0.5 mole) of 97% mercaptobenzothiazole, 33 parts (0.5 mole) of 85% potassium hydroxide, 500 ml. of acetone and 10 parts of water was added in one portion 66.8 parts (0.5 mole) of 2-chlorocyclohexanone and the stirred reaction mixture heated at 50–56° C. for 4 hours. After cooling to 25° C. the reaction mixture was added to 1000 grams of ice-water and then stirred for 1 hour at 0–10° C. The precipitate was collected by filtration, washed with water until neutral to litmus and air-dried at 25–30° C. 2-(2-benzothiazolylthio)cyclohexanone was obtained in 89.5% yield as a tan solid. After two recrystallizations from ethyl alcohol it melted at 92–93° C. Analysis gave 5.2% nitrogen and 24.4% sulfur compared to 5.3% nitrogen and 24.4% sulfur calculated for $$C_{13}H_{13}NOS_2$$

A mixed melting point with the compound of Example 1 was 92–93° C. and the infrared spectra of the two were superimposable, indicating the compounds were identical.

EXAMPLE 3

To a stirred solution of 100.8 parts (0.5 mole) of 5-chloromercaptobenzothiazole, 31.5 parts (0.5 mole) of 90% potassium hydroxide, 500 ml. of acetone and 10 ml. of water was added in one portion 66.8 parts (0.5 mole) of 2-chlorocyclohexanone and the reaction mixture heated at 50–56° C. for 4 hours. After cooling to 10° C. the reaction mixture was added to 2000 grams of ice-water and then stirred at 0–10° C. for 1 hour. The precipitate was collected by filtration, washed with water until neutral to litmus and air-dried at 25–30° C. 2-(5-chloro-2-benzothiazolylthio)cyclohexanone was obtained in 90% yield as a tan solid. After recrystallization from heptane it melted at 92–93° C. Analysis gave 4.7% nitrogen and 21.5% sulfur, the calculated values for $C_{13}H_{12}ClNOS_2$.

EXAMPLE 4

In the procedure of Example 3, 105.5 parts (0.5 mole) of 6-ethoxymercaptobenzothiazole was substituted for 5-chloromercaptobenzothiazole. After cooling to 10° C., 500 ml. of water was added. The reaction mixture was extracted with 500 ml. of ethyl ether, the ether solution washed with water until neutral to litmus and dried over sodium sulfate. The ether was removed in vacuo at a maximum temperature of 80–90° C./1.2 mm. 2-(6-ethoxy-2-benzothiazolylthio)cyclohexanone was obtained in 89.5% yield as a dark amber viscous oil. Analysis gave 4.5% nitrogen and 20.2% sulfur compared to 4.5% nitrogen and 20.9% sulfur calculated for $C_{15}H_{17}NO_2S_2$.

The functional carbonyl group imparts reactivity of a typical ketone. The products yield oximes upon treatment with salts of hydroxylamine. Reduction with sodium boronhydride yields 2-hydroxycyclohexylthiothiazoles. As indicated above the products per se accelerate the vulcanization of rubber.

The products of the above examples were demonstrated to be rubber vulcanization of accelerators by testing in the following tread stock:

| Stock | A | B | C |
|---|---|---|---|
| | Parts by weight | | |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| Antioxidant | 1.5 | 1.5 | 1.5 |
| 2-(5-Chloro-2-benzothiazolylthio)-cyclohexanone | 0.5 | | |
| 2-(2-Benzothiazolylthio) cyclohexanone | | 0.5 | |
| 2-(6-Ethoxy-2-benzothiazolylthio)-cyclohexanone | | | 0.5 |

The stocks were cured in the usual manner by heating in a press for 60 minutes at 144° C. The physical properties of the vulcanizates are set forth below:

Table I

| Stock | Modulus of Elasticity in lbs./in.² at Elongation of 300% | Tensile at Break in lbs./in.² |
|---|---|---|
| A | 1,270 | 2,410 |
| B | 1,190 | 2,600 |
| C | 1,180 | 2,220 |

The resistance of the stocks to prevulcanization (scorch) was evaluated by means of a Mooney plastometer. The time required for incipient vulcanization or scorch was taken at the point on the plasticity curve when the plasticity began to rise continuously and reached an arbitrary value of 10 unit points above the minimum value.

Table II

Stock:                               Mooney scorch in mins. at 135° C.
A                                                  17.5
B                                                  13.8
C                                                  17.6

EXAMPLE 5

As a further specific embodiment of the invention, a solution was prepared comprising 43.4 parts (0.25 mole) of 2-mercapto-4-methyl-5-thiazolyl methyl ketone, 15.8 parts (0.25 mole) of 90% potassium hydroxide, 250 ml. of acetone and 5 ml. of water. This solution was agitated while adding in one portion 33.4 parts (0.25 mole) of 2-chlorocyclohexanone. The reaction mixture was heated at 50–56° C. for 4 hours, then cooled to 25° C. A solution of 300 ml. of ethyl ether in 250 ml. of water was added and the mixture stirred for 15 minutes. The ether solution was washed with water until neutral to litmus and dried over sodium sulfate. The ether was removed in vacuo at a maximum temperature of 80–90° C./1–2 mm. 2-(5-acetyl-4-methyl-2-thiazolylthio)cyclohexanone was obtained in 83.5% yield as a dark amber oil. Analysis gave 4.9% nitrogen and 23.9% sulfur compared to 5.2% nitrogen and 23.8% sulfur calculated for $C_{12}H_{15}NO_2S_2$.

EXAMPLE 6

To a stirred solution of 101.6 parts (0.5 mole) of ethyl 2-mercapto-4-methyl-5-thiazolecarboxylate, 31.5 parts (0.5 mole) of 90% potassium hydroxide, 500 ml. of acetone and 10 ml. of water was added in one portion 66.8 grams (0.5 mole) of 2-chlorocyclohexanone and the mixture stirred at 25–30° C. for 6 hours. Then 400 ml. of water and 500 ml. of ethyl ether were added and the mixture stirred for 15 minutes. 2-(5-carboethoxy-4-methyl-2-thiazolylthio)cyclohexanone was isolated as described above. An oil was obtained in 84% yield. Analysis gave 4.5% nitrogen and 21.4% sulfur compared to 4.7% nitrogen and 21.4% sulfur calculated for $C_{13}H_{17}NO_3S_2$.

EXAMPLE 7

In the procedure of Example 6, 65.7 parts (0.5 mole) of 4-methyl-2-mercaptothiazole was substituted for the thiazole of that example and the reaction mixture heated at 50–56° C. for 4 hours. Upon isolating as described 2-(4-methyl-2-thiazolylthio)cyclohexanone was obtained in 76.6% yield as an amber oil. Analysis gave 5.8% nitrogen compared to 6.2% calculated for $C_{10}H_{13}NOS_2$.

As illustrative of accelerating properties, vulcanizable compositions were compounded comprising

| Stock | D | E | F |
|---|---|---|---|
| | Parts by weight | | |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| Antioxidant | 1 | 1 | 1 |
| 2-(5-Acetyl-4-methyl-2-thiazolylthio)-cyclohexanone | 0.5 | | |
| 2-(5-Carboethoxy-4-Methyl-2-thiazolylthio)-cyclohexanone | | 0.5 | |
| 2-(4-Methyl-2-thiazolylthio)cyclohexanone | | | 0.5 |

The stocks were cured in the usual manner in a press for 60 minutes at 144° C. The physical properties of the vulcanizates and resistance of the unvulcanized composition to scorch are set forth below:

Table III

| Stock | Modulus of Elasticity in lbs./in.² at Elongation of 300% | Tensile at Break in lbs./in.² | Ultimate Elongation, Percent | Scorch Time in Mins. at 135° C. |
|---|---|---|---|---|
| D | 1,720 | 3,480 | 530 | 7.9 |
| E | 1,720 | 3,540 | 550 | 10.2 |
| F | 1,560 | 3,280 | 520 | 10.1 |

EXAMPLE 8

To a stirred solution of 87.0 parts (0.5 mole) of 2-mercapto-4-methyl-5-thiazolecarboxamide, 31.5 parts (0.5 mole) of 90% potassium hydroxide, 500 ml. of acetone and 10 ml. of water was added in one portion 66.8 parts (0.5 mole) of 2-chlorocyclohexanone and the reaction mixture heated at 50–56° C. for 4 hours. After cooling to 25° C., the reaction mixture was added to 2,000 grams of ice-water and the solution stirred at 0–10° C. for 1 hour. The precipitate was collected by filtration, washed with water until neutral to litmus and air-dried at 25–30° C. 2-(5-carbamyl-4-methylthiazolylthio)cyclohexanone was obtained in 84.5% yield as a cream colored solid. After recrystallization from ethyl alcohol it melted at 165–167° C. Analysis gave 10.6% nitrogen and 23.9% sulfur compared to 10.4% nitrogen and 23.7% sulfur calculated for $C_{11}H_{14}N_2O_2S_2$.

EXAMPLE 9

Substituting 125 grams (0.5 mole) of 2-mercapto-4-methyl-5-thiazolecarboxanilide for the thiazole employed in Example 8, the solution of the reaction product in 2000 grams of ice-water was stirred at 0–10° C. for 3 hours. 2 - (4 - methyl - 5 - phenylcarbamylthiazolylthio)cyclohexanone was obtained in 92% yield as a white solid. After recrystallization from ethyl alcohol it melted at 132–133° C. Analysis gave 8.4% nitrogen and 18.7% sulfur compared to 8.1% nitrogen and 18.5% sulfur calculated for $C_{17}H_{18}N_2O_2S_2$.

Further illustrative of the properties of the thiazolylthiocyclohexanones of this invention, natural rubber stocks were compounded comprising

| Stock | G | H |
|---|---|---|
|  | Parts by weight ||
| Smoke sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| Antioxidant | 1 | 1 |
| 2 - (5 - Carbamyl - 4 - methylthiazolylthio)cyclohexanone | 0.5 |  |
| 2-(4-Methyl-5-phenylcarbamylthiazolylthio)-cyclohexanone |  | 0.5 |

The stocks were cured for 60 minutes in a press at 144° C. The test results obtained were as follows:

*Table IV*

| Stock | G | H |
|---|---|---|
| Modulus of Elasticity in lbs./in.² at 300% elongation | 1,000 | 1,120 |
| Tensil at Break in lbs./in.² | 2,060 | 2,410 |
| Ultimate Elongation, Percent | 500 | 500 |
| Mooney Scorch at 135° C. in minutes | 16.9 | 12.0 |

Although the invention has been illustrated by numerous specific embodiments, it is not limited thereto. For example, the thiazolylthiocyclohexanones may be used for the acceleration of other types of sulfur-vulcanizable rubbers. These rubbers comprise natural rubber in its various forms, as for example latex, crepe, smoked sheets, gutta-percha, balata and cyclo rubbers. The new compounds are applicable generally for acceleration of natural and synthetic elastomers, as for example polybutadiene, polyisoprene and polyisobutylene polymerized with a small proportion of a diolefin.

It is intended to cover all changes and modifications of the examples of the invention herein chosen for purposes of disclosure which do not constitute departure from the spirit and scope of the invention.

What is claimed is:

1. A 2-(2-thiazolylthio)cyclohexanone of the formula

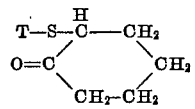

where T is a member of the group consisting of 4-(lower alkyl)-2-thiazolyl, 4-(lower alkyl)-5-(lower carboalkoxy)-2-thiazolyl, 4,5-di-(lower alkyl)-2-thiazolyl, 4-(lower carboalkoxy)-2-thiazolyl, 4-(lower alkyl)-5-acetyl-2-thiazolyl, 4-(lower alkyl)-5-carbamyl-2-thiazolyl, 4-(lower alkyl)-5-(n-phenylcarbamyl)-2-thiazolyl, 2-benzothiazolyl, monochloro-2-benzothiazolyl, mono- and di-(lower alkyl)-2-benzothiazolyl, mono-(lower alkyl)monochloro-2-benzothiazolyl, mono-(lower alkoxy)-2-benzothiazolyl, mono-(lower alkoxy)monochloro-2-benzothiazolyl, phenyl-2-benzothiazolyl, di-(lower alkyl)monochloro-2-benzothiazolyl and di-(lower alkyl)dichloro-2-benzothiazolyl.

2. 2-(2-benzothiazolylthio)cyclohexanone.
3. 2-(5-chloro-2-benzothiazolylthio)cyclohexanone.
4. 2-(6-ethoxy-2-benzothiazolylthio)cyclohexanone.
5. 2-(5-acetyl-4-methyl-2-thiazolylthio)cyclohexanone.
6. 2-(5-carboethoxy-4-methyl-2-thiazolylthio)cyclohexanone.
7. 2-(4-methyl-2-thiazolylthio)cyclohexanone.
8. 2-(5-carbamyl-4-methyl-2-thiazolylthio)cyclohexanone.
9. 2-(4-methyl-5-n-phenylcarbamyl-2-thiazolylthio)cyclohexanone.
10. Method of making a 2-(2-thiazolylthio)cyclohexanone which comprises heating a compound of the formula T—S—NH₂ where T is a member of the group consisting of 4-(lower alkyl)-2-thiazolyl, 4-(lower alkyl)-5-(lower carboalkoxy)-2-thiazolyl, 4,5-di(lower alkyl)-2-thiazolyl, 4-(lower carboalkoxy)-2-thiazolyl, 4-(lower alkyl)-5-acetyl-2-thiazolyl, 4-(lower alkyl)-5-carbamyl-2-thiazolyl, 4-(lower alkyl)-5-(n-phenylcarbamyl)-2-thiazolyl, 2-benzothiazolyl, monochloro-2-benzothiazolyl, mono- and di-(lower alkyl)-2-benzothiazolyl, mono-(lower alkyl)monochloro-2-benzothiazolyl, mono-(lower alkoxy)-2-benzothiazolyl, mono-(lower alkoxy)monochloro-2-benzothiazolyl, phenyl-2-benzothiazolyl, di-(lower alkyl)monochloro-2-benzothiazolyl and di-(lower alkyl)dichloro-2-benzothiazolyl with cyclohexanone in the presence of hydroxyl ion and isolating a 2-(2-thiazolylthio)cyclohexanone.

11. The method of claim 10 where T is 2-benzothiazolyl.

No references cited.